(12) United States Patent
Scott et al.

(10) Patent No.: US 11,390,199 B2
(45) Date of Patent: Jul. 19, 2022

(54) SEATING MODULE FOR A SEAT

(71) Applicant: ADIENT ENGINEERING AND IP GMBH, Burscheid (DE)

(72) Inventors: Bethany M. Scott, South Lyon, MI (US); David B. Bakker, Pinckney, MI (US); Eric Bernard Michalak, Canton, MI (US)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/045,680

(22) PCT Filed: Apr. 10, 2019

(86) PCT No.: PCT/EP2019/059134
§ 371 (c)(1),
(2) Date: Oct. 6, 2020

(87) PCT Pub. No.: WO2019/197488
PCT Pub. Date: Oct. 17, 2019

(65) Prior Publication Data
US 2021/0155130 A1    May 27, 2021

Related U.S. Application Data

(60) Provisional application No. 62/655,261, filed on Apr. 10, 2018.

(51) Int. Cl.
*B60N 2/58* (2006.01)
*B60N 2/60* (2006.01)
*B60N 2/70* (2006.01)
*B60N 2/56* (2006.01)

(52) U.S. Cl.
CPC ............... *B60N 2/58* (2013.01); *B60N 2/70* (2013.01); *B60N 2/565* (2013.01); *B60N 2/5628* (2013.01); *B60N 2/5657* (2013.01)

(58) Field of Classification Search
CPC ................................ B60N 2/58; B60N 2/70
See application file for complete search history.

(56) References Cited

U.S. PATENT DOCUMENTS

| | | | | |
|---|---|---|---|---|
| 5,626,021 A | * | 5/1997 | Karunasiri | A47C 7/74 236/49.3 |
| 6,817,675 B2 | * | 11/2004 | Buss | B60N 2/5635 297/180.11 |
| 10,252,650 B2 | * | 4/2019 | Perraut | B60N 2/565 |
| 2002/0140258 A1 | * | 10/2002 | Ekern | B60N 2/5635 297/180.14 |
| 2005/0066505 A1 | * | 3/2005 | Iqbal | B60N 2/5635 29/428 |

(Continued)

FOREIGN PATENT DOCUMENTS

| | | |
|---|---|---|
| EP | 3 006 262 A1 | 4/2016 |
| WO | 201414556 A1 | 9/2014 |

OTHER PUBLICATIONS

PCT International Search Report and Written Opinion (PCT/EP2019/059134).

*Primary Examiner* — Shin H Kim
(74) *Attorney, Agent, or Firm* — Marshall & Melhorn, LLC

(57) ABSTRACT

A seating module for a seat, in particular a vehicle seat, may have at least a substantially air-permeable upholstery part. The upholstery part is substantially configured to let air-flow pass through horizontally.

12 Claims, 4 Drawing Sheets

(56) References Cited

U.S. PATENT DOCUMENTS

| | | | |
|---|---|---|---|
| 2006/0208540 A1* | 9/2006 | Lofy | B60N 2/565 297/180.14 |
| 2010/0298455 A1* | 11/2010 | Henning | C08J 9/0061 521/112 |
| 2011/0257280 A1* | 10/2011 | Glos | C08J 9/0061 521/54 |
| 2011/0293682 A1* | 12/2011 | Walker | A01N 25/28 424/408 |
| 2012/0015574 A1* | 1/2012 | Severich | C08G 18/755 442/79 |
| 2012/0021229 A1* | 1/2012 | Cunningham | C08G 18/10 428/423.1 |
| 2012/0097070 A1* | 4/2012 | Serobian | C09D 183/04 106/287.1 |
| 2012/0121876 A1* | 5/2012 | Milesi | C08L 83/04 428/220 |
| 2012/0196953 A1* | 8/2012 | Ziolkowski | A01N 55/00 523/122 |
| 2013/0174346 A1* | 7/2013 | Klancnik | B32B 5/024 5/698 |
| 2014/0090829 A1* | 4/2014 | Petrovski | B60N 2/5635 165/203 |
| 2015/0158968 A1* | 6/2015 | Schmitz | C08G 18/244 521/126 |
| 2015/0224006 A1* | 8/2015 | Primo | A61G 5/1045 297/180.14 |
| 2016/0256584 A1* | 9/2016 | Veenstra | A01N 37/36 |
| 2017/0028886 A1 | 2/2017 | Zhang et al. | |
| 2017/0038795 A1* | 2/2017 | Lettow | B60N 2/56 |
| 2017/0164757 A1* | 6/2017 | Thomas | B60N 2/5692 |
| 2020/0187687 A1* | 6/2020 | Helms | A47G 9/1081 |
| 2021/0046728 A1* | 2/2021 | Bell | B32B 27/36 |
| 2021/0155130 A1* | 5/2021 | Scott | B60N 2/58 |

* cited by examiner

SEATING MODULE FOR A SEAT

BACKGROUND OF THE DISCLOSURE

The present disclosure relates generally to a seating module, e.g. a seat pan, a seat part, a backrest or a leg rest, for a seat, in particular vehicle seat.

A seating module for a seat according to the state of the art may comprise a trim cover and an upholstery part, wherein the trim cover comprises through vertical holes at an A-side of the seat for ventilation. Further, seating modules according to the state of the art may be coupled to a blower/fan or electrical devices to cause air-flow through the seating module.

For example, US 2017/0028886 A1 describes an air conditioner device with at least one ventilation device for a vehicle seat. The ventilation device comprises a fluid transport device and a fluid exchange device. In particular, the vehicle seat comprises fluid exchange zones, wherein at least one operational state of the fluid exchange zones is attached to a fluid inlet or a fluid outlet of the fluid transport device.

SUMMARY OF THE DISCLOSURE

It is an object of the present disclosure to provide an improved seating module for a seat, in particular vehicle seat and a seat with such a seating module. Further, an object of the present disclosure is to provide improved ventilation, water and dirt management to the seating module.

According to the disclosure, the object is solved by a seating module claimed in claim 1.

According to the disclosure, a seating module for a seat, in particular a vehicle seat, comprises at least a substantially air-permeable upholstery part, wherein the upholstery part is substantially configured to let air-flow pass through horizontally.

In particular, the upholstery module is configured to let air-flow pass through a lateral side, e.g. a front side or a back side, of the seating module and flow through the upholstery part horizontally. For example, the front side or the back side is a side arranged transversely with respect to a length expansion of a vehicle. In particular, the seating module may comprise a substantially fluid-proof cover element, the substantially air-permeable upholstery part which is relatively mounted to a seat support structure of the seat, wherein the upholstery part is substantially configured to let air-flow pass through laterally.

According to an embodiment of the seating module, the upholstery part is configured to be impinged with air-flow caused by vehicle speed and atmospheric pressure. In particular, a use of electrical ventilation or thermal conditioning devices can be decreased within the seat. Thereby, an assembly time and assembly costs can be reduced. Further, an assembly space and a weight of the seating module can be minimized.

In an alternative embodiment, the upholstery part comprises a lateral inlet to suck ambient air through the lateral inlet. In particular, the upholstery part is interconnected with a vacuum attachment to suck the ambient air through the lateral inlet.

Furthermore, the seating module may be configured to substantially eliminate water entry whilst ensuring ventilation of the seating module. Water is prevented to penetrate the seating module or devices, such as electric devices and/or adjustment devices of the seat arranged underneath the seating module. Thereby, a service life of the seating module and any other devices of the seat are increased. Particularly, durability and stability of material quality of the seating module can be increased, whereas material suffering from damage by water intrusion causing degradation of the seating module will be substantially mitigated or nearly prevented.

Moreover, by letting air-flow pass through laterally and horizontally, ventilation, water and dirt extraction will not affect a feeling of an occupant while seated. In particular, lateral and horizontal air-flow allows ventilation, water and dirt extraction while the occupant is seated thereon. A direct contact with air-flow through an A-surface, that means a surface facing towards the occupant, is avoided.

Exemplarily, when the occupant is seated, the upholstery part is in a compressed state, whereby air-flow can still pass laterally and horizontally through the seating module. When the occupant leaves the seat, the upholstery module is configured to substantially expand, whereas air-flow can be stimulated in a direction of expansion of the upholstery module.

Further, the fluid-proof cover element, such as a trim cover of the seating module, in particular its top surface can be easily cleaned. In particular, the cover element is made of fluid/liquid-proof materials. For example, the cover element is at least partially made of fluid-proof leather, textile or synthetic material.

In particular, the seating module can be mounted to a seat frame assembly of the seat. For instance, the seating module can be part of at least one of a seat pan, a backrest and a leg-rest.

According to an exemplary embodiment of the breathable seating module, the upholstery part is configured to let air-flow pass towards a bottom side.

In particular, the upholstery part may comprise a bottom outlet to let the air-flow pass towards a bottom side of the seating module through the bottom outlet. In particular, the upholstery part is configured to allow drainage with respect to the bottom side of the upholstery part.

In another exemplary embodiment, the upholstery part is arranged on a support shell relatively coupled to the seat. For example, the support shell is part of the seating module. The support shell is formed as one of a seat frame, a seat pan frame or a backrest frame of the seat. The support shell can be at least partially made of synthetic material providing stability to the upholstery part. Exemplarily, the support shell forms a shell in which the upholstery part is inserted.

According to a further embodiment, the support shell comprises at least one of a number of vertical channels forming the bottom outlet. Furthermore, the support shell may comprise at least one of a number of lateral openings forming the lateral inlet.

According to another aspect, a vacuum attachment is provided and interconnected with the bottom outlet to allow drainage and dirt discharge at the bottom side of the upholstery part.

For example, by adding the vacuum attachment to a bottom side of the support shell with the upholstery part, such as a cushion pan, the seating module can be attached to a vacuum. The vacuum will extract excess water and dirt from the upholstery part. In another embodiment, the support shell comprises the bottom outlet, such as a vertical channel, arranged at the bottom side of the upholstery part. For instance, the bottom outlet is configured as an opening or through hole. The outlet can comprise a reticulated element which is air-permeable and fluid-permeable.

In another embodiment of the seating module, the upholstery part is enclosed by the cover element and the support shell. In particular, the support shell forms a lower support structure of the upholstery part and the cover element forms an upper coverage structure of the upholstery part. For example, the support shell comprises a bowl-shape. The support shell provides a stable support and the cover element provides comfortable seating to the occupant. That means that the upholstery part is arranged between the support shell and the cover element. Particularly, the upholstery part is at least arranged in such a manner that the upholstery part is distanced from the cover element. Additionally or optionally, the upholstery part is arranged distanced from the support shell. Therefore, air-flow can pass through gaps provided between the upholstery part and each of the support shell and/or cover element. In an exemplary embodiment, mesh elements are provided within the gaps. Particularly, the upholstery part is fixedly mounted with its rear or back side and/or at least one lateral side and/or partially its front side to the support shell. The cover element is fixedly mounted to the support shell.

In a further possible embodiment, the cover element and the support shell are mounted to each other such that at least one opening is formed laterally. In particular, the seating module comprises at least one lateral inlet which is provided by the opening. Further, the opening is provided at a front side of the seating module. Moreover, the opening can comprise a reticulated element, such as a mesh, net-like element to substantially prevent dirt and dust to be impinged by the air-flow. Particularly, the reticulated element is configured to allow air through whilst ensuring optical properties to the occupant such that the opening is optically covered.

According to an embodiment of the seating module, the upholstery part comprises at least a substantially fluid-resistant foam element and at least one air-permeable mesh element. The upholstery part can comprise a sandwich-structure, whereas a first air-permeable mesh element, such as a spacer element, particularly a 3D-spacer element, is arranged on a top surface of the foam element. A second air-permeable mesh element is arranged on a lower, particularly bottom surface of the foam element. For example, the mesh/spacer element is made of fluid-proof, particularly water-proof material. Particularly, the mesh/spacer element is adapted to allow air-flow. For instance, the mesh/spacer element can be one of a fluid-proof and air-permeable foam pad. Thereby, the mesh element can be one of a reticulated foam pad.

According to a further embodiment, the foam element comprises a number of vertical through holes. The vertical through holes are adapted to add, particularly promote ventilating of the seating module. Exemplarily, the foam element is made of fluid-resistant material, such as synthetic material and/or textile and/or fibres, particularly water-resistant foam.

Furthermore, the foam element may comprise channels, e.g. flow channels formed by gaps between the vertical through holes. The vertical through holes may arrange matrix-like with flow channels between them.

In an exemplary embodiment, the cover element comprises reinforcing and fluid-resistant seams. In particular, water entry can be substantially eliminated by reinforcing seams with exemplarily seam sealing tape. In particular, the cover element comprises fluid-resistant sew styles, such as double join sewing and double joined seams. Further, the cover element can comprise ventilation mesh windows.

According to another exemplary embodiment, at least one of the cover element and the upholstery part comprises biocide material. For example, the biocide material can be chemical added to the cover element and/or the upholstery part. Optionally or additionally, the biocide material can be added while fabrication of the cover element and/or the upholstery part.

The disclosure further relates to a seat, in particular a vehicle seat, comprising a breathable seating module as described above.

In particular, the seating module described above is configured as a breathable seating module.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1A:
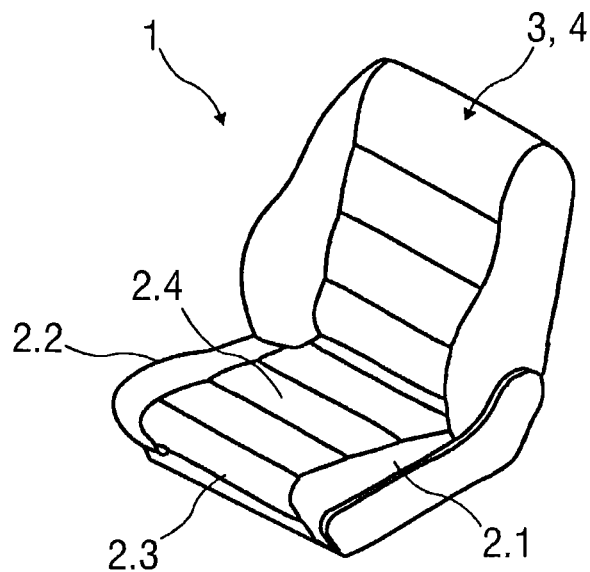
FIGS. 1A, 1B show schematically a perspective view and a side view of an embodiment of a seat, in particular vehicle seat, comprising at least one seating module.
Figure 1B:
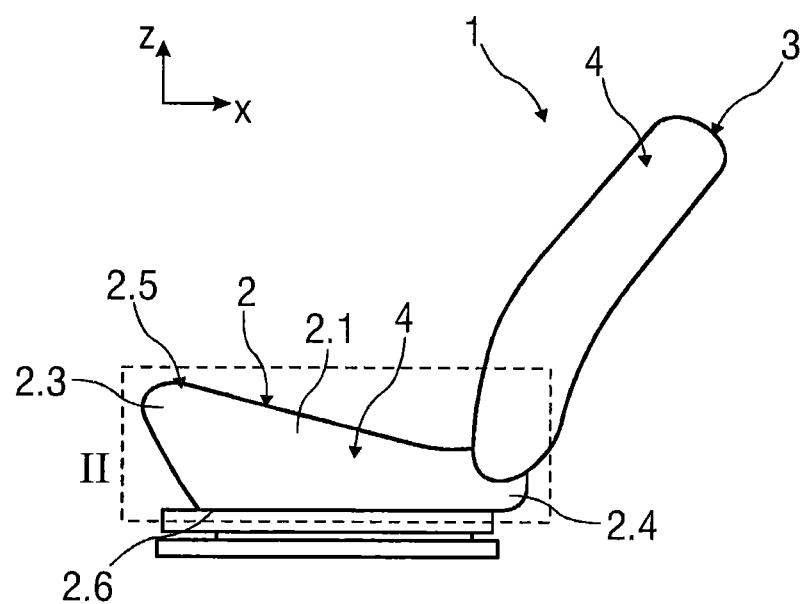

FIG. 1A shows a schematically perspective view of an embodiment of a seat 1, in particular a vehicle seat. FIG. 1B shows a schematically side view of the seat 1.

For a better understanding of subsequent descriptions of the seat 1 a coordinate system is shown in further figures. The coordinate system comprises a longitudinal axis x, a transverse axis y and a vertical axis z in relation to an interior space of the vehicle, in which the seat 1 is located.

The seat 1 generally comprises a seat pan 2 and a backrest 3. The seat pan 2 comprises a seating module 4 as described more in detail below.

In particular, the seating module 4 is configured as a cushioned seating surface for an occupant of the seat 1.

Further, the backrest 3 can comprise such a seating module 4 which is configured as a cushioned leaning surface for an occupant of the seat 1. For instance, each of the seating modules 4 is configured as an upholstery module of at least one of the components of the seat 1, e.g. of the seat pan 2 and/or the backrest 3.

The seating module 4 is described more in detail for example for the seat pan 2 as follows:

The seat pan 2 comprises two lateral seat pan sides 2.1, 2.2. Further, the seat pan 2 comprises a front seat pan side 2.3, a back seat pan side 2.4, a top seat pan side 2.5 and a bottom seat pan side 2.6. The backrest 3 is arranged at the back seat pan side 2.4. For instance, the backrest 3 can be adjusted with respect to the seat pan 2. According to another embodiment of the seat 1, a not further shown leg-rest can be coupled to the front seat pan side 2.3.

Figure 2:
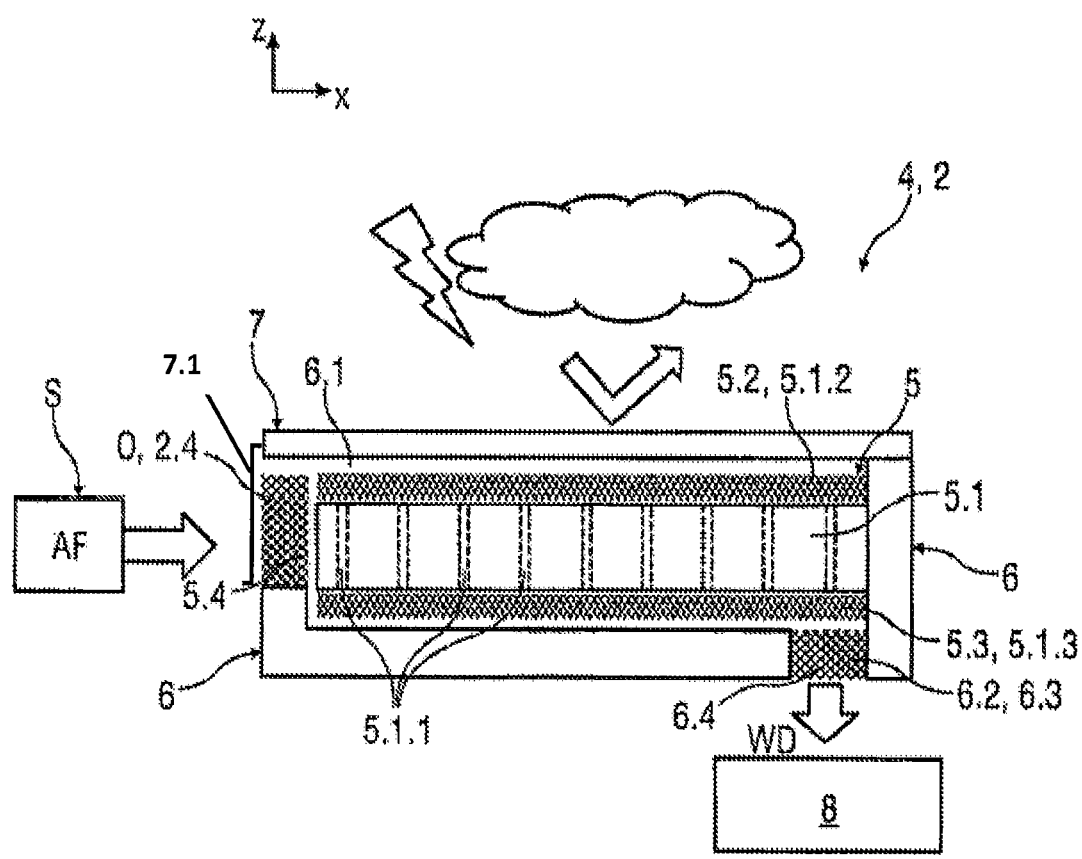
FIG. 2 shows a schematic sectional view of an embodiment of the seating module according to FIGS. 1A, 1B, and FIGS. 3A and 3B show each a schematic perspective view of an embodiment of a foam element of the seating module.

FIG. 2 shows a schematic sectional view of the seating module 4, in particular in form of the seat pan 2.

To provide a breathable seating module 4, the seating module 4, e.g. the seat pan 2, comprises a substantially air-permeable upholstery part 5. The upholstery part 5 is substantially configured to let air-flow AF pass intro laterally and pass through horizontally. In particular, the upholstery part 5 comprises a lateral inlet IN to enter or to suck ambient air AA through the lateral inlet IN.

The upholstery part 5 is configured to be impinged with air-flow AF caused by vehicle speed and atmospheric pressure. Alternatively or additionally, the upholstery part 5 is interconnected with a vacuum attachment 8 to suck the ambient air AA, e.g. inside the vehicle or from the outside of the vehicle, through the lateral inlet IN.

The upholstery part 5 comprises further at least one bottom outlet OUT to let the air-flow AF pass towards the bottom side 2.6 of the seating module (4) through the at least one bottom outlet OUT.

The upholstery part 5 comprises a foam element 5.1. The foam element 5.1 is a foam pad made of fluid-resistant foam. Further, the foam element 5.1 comprises chemical added biocide, material. Moreover, the foam element 5.1 comprises through holes 5.1.1 which are arranged in vertical manner. The through holes 5.1.1 are configured to promote ventilation, particularly circulation of air-flow AF.

The upholstery part 5 comprises a mesh element 5.2 arranged on a top surface 5.1.2 of the foam element 5.1. Further, the upholstery part 5 comprises a mesh element 5.3 arranged on a lower surface 5.1.3, particularly at a bottom side, of the foam element 5.1. The mesh elements 5.2, 5.3 are configured from reticulated foam. Therefore, air-flow AF can be stimulated when the upholstery part 5 is not compressed. For instance, the mesh elements 5.2, 5.3 are each a fluid-proof spacer element, such as a 3D-spacer element or fabric, allowing air-flow AF.

In particular, vehicle speed and atmospheric pressure force air through the upholstery part 5. Thereby, a source S is located in front of the upholstery part 5 to feed the air-flow AF through the lateral inlet IN into the upholstery part 5. The upholstery part 5 is substantially configured to let air-flow AF pass through laterally into the inlet IN and pass through horizontally within the upholstery part 5. In the shown embodiment, air-flow AF is impinged from a front side 5.4 of the upholstery part 5 and thus a front-side 2.3 of the seating module 4.

In another embodiment, the source S can be provided by a blower/fan device. In a further embodiment, ambient air AA, e.g. from outside the vehicle or inside the vehicle, is used to supply into the lateral inlet IN at the front-side 2.3 of the seating module 4. In yet a further embodiment, the seating module 4 may comprise additional lateral inlets IN at the back-side 2.4 or at one of the lateral sides 2.1, 2.2 of the seating module 4 and/or additional bottom outlets OUT at the bottom-side 2.6 of the seating module 4.

In particular, the horizontal air-flow AF passes through the upper mesh element 5.2 and the lower mesh element 5.3. Additionally the horizontal air-flow AF may horizontally pass through flow channels 5.5 (shown in FIG. 3A, 3C) formed e.g. by gaps in the foam element 5.1 from the inlet IN to the outlet OUT of the seating module 4.

Further, the seating module 4 comprises a support shell 6 in which the upholstery part 5 is arranged. In particular, the support shell 6 is configured to partially surround the upholstery module 5. In the shown embodiment, the support shell 6 comprises an opened upper surface 6.1 to provide a comfortable and substantially flexible seating surface to the occupant. The support shell 6 can be part of the seat 1, such as in form of a frame assembly. Particularly, the support shell 6 is coupled to a seat structure. Optionally, the support shell 6 is part of the seating module 4, whereas the support shell 6 can be mounted to a seat support structure of the seat 1. For example, the support shell 6 can be partially inserted into a space provided by a frame assembly of the seat 1. In particular, the support shell 6 is made of synthetic, stable material. Further, the support shell 6 is shaped as a seat cushion pan.

The support shell 6 comprises at least one vertical channel 6.2 on a bottom surface 6.3 to promote drainage of the seating module 4, particularly of the upholstery part 5. For example, the vertical channel 6.2 can comprise a reticulated element 6.4. The vertical channel 6.2 forms the bottom outlet OUT at the bottom side 2.6 of the seating module 4.

In the shown embodiment, the vertical channel 6.2 is connected with a vacuum attachment 8. When attached to a vacuum, excess water and dirt WD from the upholstery part 5, so out of the seating module 4, will be extracted. Hence, the vacuum attachment 8 is configured to allow drainage and dirt discharge at the bottom side 2.6 of the upholstery part 5.

Moreover, the seating module 4 comprises a substantially fluid-proof cover element 7. In the shown embodiment, the cover element 7 and the support shell 6 are mounted to each other such that at least one air-inlet opening O is formed laterally of the breathable seating module 4. In particular, the opening O is formed at the front side 2.3 of the seat pan 2 and forms the lateral inlet IN of the seating module 4. Therefore, air-flow AF can be force impinged by the source S, using vehicle speed and atmospheric pressure, and/or from ambient air AA. Furthermore, the air-flow inlet opening O can comprise a reticulated element 7.1. The reticulated element 7.1 prevents e. g. fluid, such as water, dirt and dust to be impinged with the air-flow AF.

The cover element 7 is configured to cover the opened upper surface 6.1 and so as to enclose the upholstery part 5. For example, the cover element 7 is a trim cover of the seating module 4. Particularly, the cover element 7 comprises not further shown reinforcing and fluid-resistant seams. Moreover, water entry can be substantially eliminated by the reinforcing seams with exemplarily seam sealing tapes. In particular, the cover element 7 is made of fluid-resistant sew styles, such as double join sewing comprising double joined seams. Further, the cover element 7 can comprise ventilation mesh windows. For example, the cover element 7 is at least partially made of fluid-proof leather, textile or synthetic material. Moreover, the cover element 7 comprises biocide material.

Figure 3A:
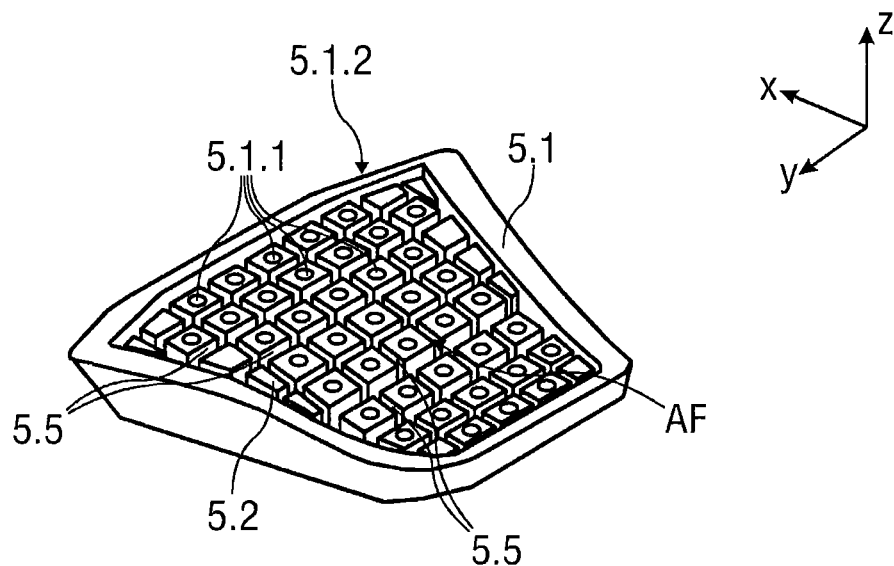
FIGS. 3C and 3D show each a schematic perspective view of an alternative embodiment of a foam element of the seating module.
Figure 3B:
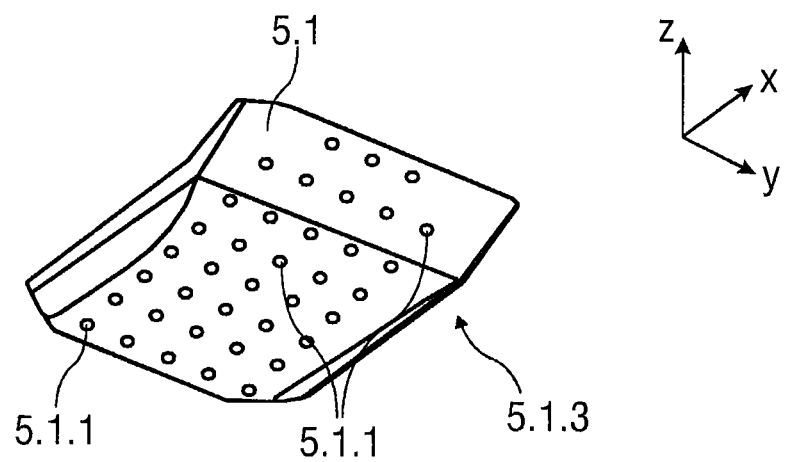

FIGS. 3A and 3B each shows a schematic perspective view of an embodiment of the foam element 5.1 of the seating module 4, particularly of its upholstery part 5. The foam element 5.1 is configured as a separate foam part for a seating area of the seating module 4. The foam element 5.1 is configured to let air-flow AF pass through horizontally.

In particular, FIG. 3A shows the foam element 5.1 in a perspective upper view, wherein the top surface 5.1.2 and upper end portions of the through holes 5.1.1 are shown. The through holes 5.1.1 may be arranged in a matrix-like manner so that horizontal flow channels 5.5 are provided to support the horizontal pass through of the air-flow AF. In particular, the 15 through holes 5.1.1 are being spaced from one another by gaps forming the horizontal flow channels 5.5. The horizontal flow channels 5.5 are arranged crosswise for instance.

FIG. 3B shows the foam element 5.1 in a perspective bottom view, wherein the lower surface 5.1.3 and bottom end portions of the through holes 5.1.1 are shown.

Figure 3C:
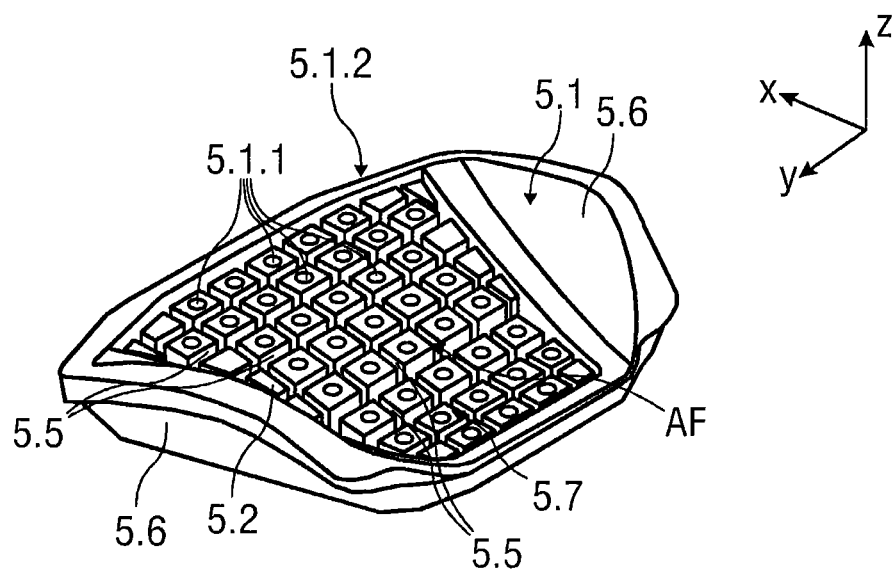
Figure 3D:
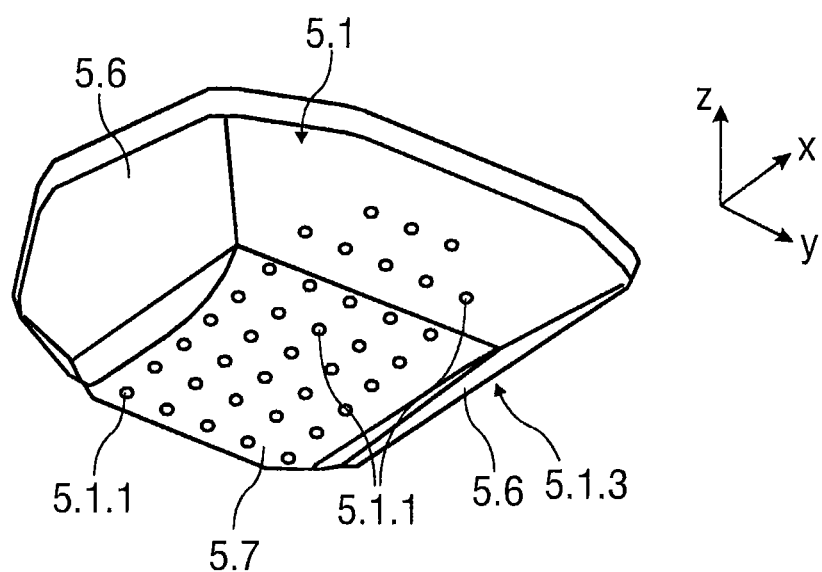

FIGS. 3C and 3D show each a schematic perspective view of an alternative embodiment of a foam element 5.1 of the seating module 4.

The foam element 5.1 comprises an intermediate area 5.7 between two lateral side bolsters 5.6. The intermediate area 5.7 is configured to let air-flow AF pass through horizontally, e.g. through the horizontal flow channels 5.5.

LIST OF REFERENCES

1 seat
2 seat pan
2.1, 2.2 lateral seat pan side
2.3 front seat pan side
2.4 back seat pan side
2.5 top seat pan side
2.6 bottom seat pan side
3 backrest
4 seating module
5 upholstery part
5.1 foam element
5.1.1 through hole
5.1.2 top surface
5.1.3 lower surface
5.2, 5.3 mesh element
5.4 front side
5.5 flow channel
5.6 lateral side bolsters
5.7 intermediate area
6 support shell
6.1 upper surface
6.2 channel
6.3 bottom surface
6.4 reticulated element
7 cover element
7.1 reticulated element
8 vacuum attachment
AF air-flow
IN inlet
O opening
OUT outlet
S source
WD water and dirt
x longitudinal axis
y transverse axis
z vertical axis

The invention claimed is:

1. A seating module for a vehicle seat, consisting of:
an upper layer comprising a mesh material, wherein said mesh material is adapted to accommodate lateral fluid flow therethrough,
a liquid resistant foam layer located below said upper layer, wherein said foam layer has a plurality of vertically extending fluid through holes to transport fluid from the upper layer, through a second mesh element arranged on a lower surface of said foam layer, to a fluid resistant support shell arranged on a lower surface of said second mesh element below said foam layer, said support shell having with a fluid outlet, and
a fluid proof cover element extending at least partially over said upper layer.

2. The seating module according to claim 1, wherein the upper layer is configured to be impinged with air-flow caused by vehicle speed and atmospheric pressure.

3. The seating module according to claim 1, wherein the fluid resistant support shell comprises a lateral inlet to suck ambient air through the lateral inlet.

4. The seating module according to claim 3, wherein the fluid resistant support shell is interconnected with a vacuum attachment to suck the ambient air through the lateral inlet.

5. The seating module according to claim 1, wherein the fluid resistant support shell comprises a bottom outlet to let the air-flow pass towards a bottom side of the seating module through the bottom outlet.

6. The seating module according to claim 1, wherein the support shell comprises at least one of a number of vertical channels forming the bottom outlet and/or at least one of a number of lateral openings forming the lateral inlet.

7. The seating module according to claim 4, wherein the vacuum attachment is configured to allow drainage and dirt discharge at the bottom side of the seating module.

8. The seating module according to claim 1, wherein the cover element and the support shell are mounted to each other such that at least one opening is formed laterally.

9. The seating module according to claim 1, wherein the upper layer is arranged on a top surface of the foam layer.

10. The seating module according to claim 1, wherein the cover element comprises reinforcing and fluid-resistant seams.

11. The seating module according to claim 1, wherein at least one of the cover element and the foam layer comprises biocide material.

12. A seating module for a vehicle seat, comprising:
an upper layer comprising a mesh material, wherein said mesh material is adapted to accommodate lateral fluid flow therethrough,
a liquid resistant foam layer located below said upper layer, wherein said foam layer has a plurality of vertically extending fluid through holes to transport fluid from the upper layer to a fluid resistant support shell below said foam layer, said support shell having with a fluid outlet, and
a fluid proof cover element extending at least partially over said upper layer,
wherein the fluid resistant support shell comprises a lateral inlet to suck ambient air through the lateral inlet,
wherein the fluid resistant support shell is interconnected with a vacuum attachment to suck the ambient air through the lateral inlet, and
wherein the vacuum attachment is configured to allow drainage and dirt discharge at the bottom side of the seating module.

* * * * *